US012585705B2

(12) United States Patent
Xin et al.

(10) Patent No.: US 12,585,705 B2
(45) Date of Patent: Mar. 24, 2026

(54) FEATURE SPACE MANAGEMENT

(71) Applicant: Lemon Inc., Grand Cayman (KY)

(72) Inventors: Meng Xin, Los Angeles, CA (US);
Silun Wang, Los Angeles, CA (US);
Huang Zou, Los Angeles, CA (US); Yu Zhang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 273 days.

(21) Appl. No.: 18/458,001

(22) Filed: Aug. 29, 2023

(65) Prior Publication Data
US 2025/0077587 A1     Mar. 6, 2025

(51) Int. Cl.
*G06F 16/00*         (2019.01)
*G06F 16/906*        (2019.01)

(52) U.S. Cl.
CPC .................................. *G06F 16/906* (2019.01)

(58) Field of Classification Search
CPC ... G06F 16/906; G06V 10/7715; G06N 20/00
See application file for complete search history.

(56) References Cited

U.S. PATENT DOCUMENTS

2020/0251100 A1 *   8/2020   Tan .......................... G06N 3/08

FOREIGN PATENT DOCUMENTS

| CN | 106604066 A | 4/2017 |
|----|-------------|--------|
| CN | 108260008 A | 7/2018 |
| CN | 114419501 A | 4/2022 |

OTHER PUBLICATIONS

Armanfard et al., "Local Feature Selection for Data Classification", IEEE Transactions on Pattern Analysis and Machine Intelligence, IEEE Computers Society, USA, XP011611226, vol. 38, No. 6, Jun. 1, 2016, pp. 1217-1227.
Cao et al., "Unifying Deep Local and Global Features for Image Search", arxiv.org, Cornell university library, 201 Olin library Cornell university Ithaca, NY, 14853, XP081762850, Sep. 15, 2020, pp. 1-25.
Extended European Search Report and Search Opinion received for European Application No. 24196943.5, mailed on Jan. 22, 2025, 10 pages.

* cited by examiner

*Primary Examiner* — Paul Kim
(74) *Attorney, Agent, or Firm* — Astute IP Law Group

(57)                    ABSTRACT
There are proposed methods, devices, and computer program products for extending a feature space of a data sample. In the method, a global representation is obtained for a feature in a plurality of features of the data sample. A local representation is obtained for the feature based on a classifying criterion for classifying the data sample into one of a plurality of predefined domains. A representation is generated for the feature of the data sample based on the global representation and the local representation. With these implementations, an exclusive feature space may be created for each domain identified by the classifying criterion, which is dedicated to capturing domain-specific knowledge and characteristics.

18 Claims, 5 Drawing Sheets

100

200

300 ⟶

310 DIMENSION SIZE

220

REPRESENTATION

320 LOCAL DIMENSION SIZE      330 GLOBAL DIMENSION SIZE

230

LOCAL REPRESENTATION

GLOBAL REPRESENTATION

PORTION   PORTION   ...

232   234   240

340 PORTION SIZE     342 PORTION SIZE

400 ⟶

220

REPRESENTATION

230

LOCAL REPRESENTATION

GLOBAL REPRESENTATION

0...00   0...00   ...

232 PORTION      234 PORTION      240

500

600

700

800

900

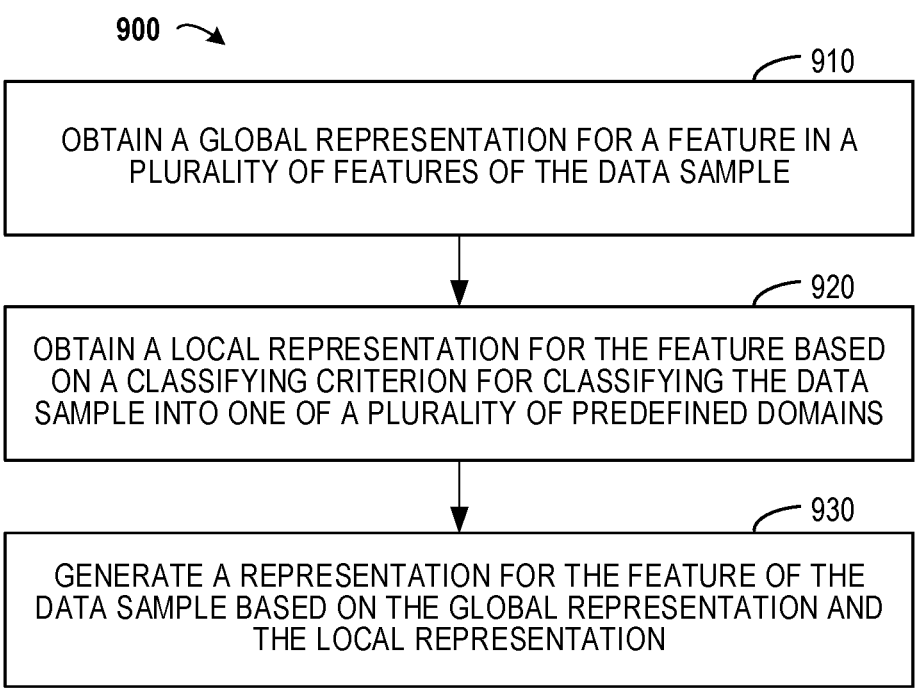

910

OBTAIN A GLOBAL REPRESENTATION FOR A FEATURE IN A
PLURALITY OF FEATURES OF THE DATA SAMPLE

920

OBTAIN A LOCAL REPRESENTATION FOR THE FEATURE BASED
ON A CLASSIFYING CRITERION FOR CLASSIFYING THE DATA
SAMPLE INTO ONE OF A PLURALITY OF PREDEFINED DOMAINS

930

GENERATE A REPRESENTATION FOR THE FEATURE OF THE
DATA SAMPLE BASED ON THE GLOBAL REPRESENTATION AND
THE LOCAL REPRESENTATION

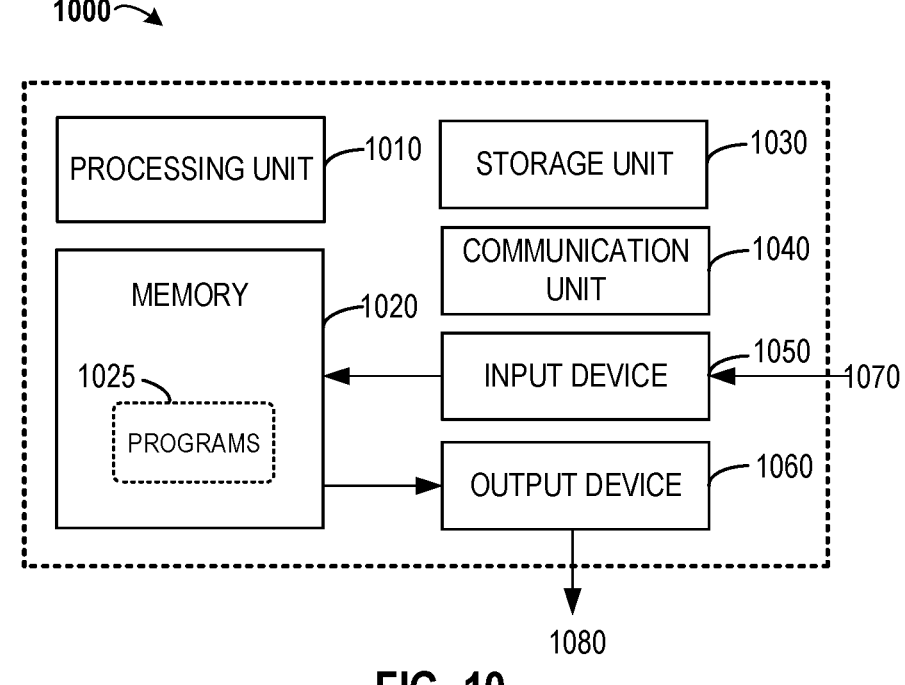

PROCESSING UNIT —1010

STORAGE UNIT —1030

COMMUNICATION
UNIT —1040

MEMORY —1020

INPUT DEVICE —1050

1070

1025

PROGRAMS

OUTPUT DEVICE —1060

FEATURE SPACE MANAGEMENT

FIELD

The present disclosure generally relates to feature space management, and more specifically, to methods, devices, and computer program products for extending a feature space of a data sample according to a domain related to the data sample.

BACKGROUND

Nowadays, the machine learning technique has been widely used in data processing. In the machine learning technique, various features may be collected from a data sample, and then these features may be converted into an embedding space to represent the data sample. Usually, a shared feature space is employed to represent data samples from all domains, which may hinder its performance when dealing with diverse domains. At this point, it is desired to represent the feature of the data sample related to various domains in a more effective way.

SUMMARY

In a first aspect of the present disclosure, there is provided a method for extending a feature space of a data sample. The method comprises: obtaining a global representation for a feature in a plurality of features of the data sample; obtaining a local representation for the feature based on a classifying criterion for classifying the data sample into one of a plurality of predefined domains; and generating a representation for the feature of the data sample based on the global representation and the local representation.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features and advantages of the present disclosure will become more apparent, wherein the same reference generally refers to the same components in the implementations of the present disclosure.

FIG. 9 illustrates an example flowchart of a method for feature space management according to implementations of the present disclosure; and FIG. 10 illustrates a block diagram of a computing device in which various implementations of the present disclosure can be implemented.

DETAILED DESCRIPTION

Figure 1:
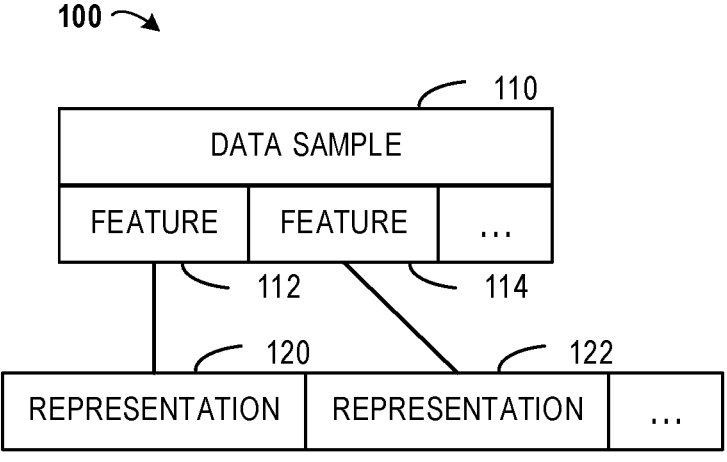
FIG. 1 illustrates an example environment for feature space management according to the machine learning technique.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

It may be understood that data involved in the present technical solution (including but not limited to the data itself, the acquisition or use of the data) should comply with requirements of corresponding laws and regulations and relevant rules.

It may be understood that, before using the technical solutions disclosed in various implementation of the present disclosure, the user should be informed of the type, scope of use, and use scenario of the personal information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's personal information. Therefore, the user may independently choose, according to the prompt information, whether to provide the personal information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the personal information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

Nowadays, the machine learning technique has been widely used in data processing. In the machine learning technique, various features may be collected from a data sample, and then these features may be converted into embedding space to represent the data sample. Referring to FIG. 1 for a brief of the feature space management, here FIG. 1 illustrates an example environment 100 for feature space management according to the machine learning technique. As illustrated in FIG. 1, a data sample 110 may include multiple features 112, 114, and the like. Here, the data sample 110 may be a data entry that will be processed by a machine learning model, and the data sample 110 may have various features depending on a purpose of the machine learning model.

For a purpose of description, a recommendation model may be taken as an example machine learning model. For example, the recommendation model may receive user data and video data and then output a probability level whether the user is interested in the video. At this point, the features of the data sample may include features related to the user (for example, a user ID, a device type of the user, an OS type of the device, and the like) and features related to the video (for example, a video ID, a video resolution, a video length, and the like). Here, each feature may be indicated by a corresponding representation, for example, the feature 112 may be indicated by a representation 120, and the feature 114 may be indicated by a representation 122, and the like.

Usually, the representation has a feature space with a fixed dimension size (for example, 16 bits, or another size) to represent data samples from all domains, which may hinder its performance when dealing with diverse domains. With a single feature space shared by all the domains, the machine learning model cannot effectively capture domain-specific knowledge. For example, in a case where the video includes to shopping and gaming data, user behaviors and preferences may significantly differ from each other. A single feature space fails to adequately distinguish and represent these diverse user behaviors and preferences, which leads to suboptimal distinction for the shopping video and the gaming video. At this point, it is desired to represent the feature of the data sample related to various domains in a more effective way.

In view of the above, the present disclosure proposes feature space management solution based on a domain of the data sample. Generally, the data sample may be classified into a specific domain according to a predefined classifying criterion. Then, a local representation is obtained based on the specific domain and then the local representation is used in generating the representation for the data sample. In other words, domain information is added in an extended feature space for the data sample.

With these implementations of the present disclosure, exclusive feature space may be created for each domain identified from the classifying criterion, which is dedicated to capturing domain-specific knowledge and characteristics. Through the extended feature space, the machine learning model may tailor its predictions to accommodate the unique preferences and behaviors exhibited in different domains.

Figure 2:
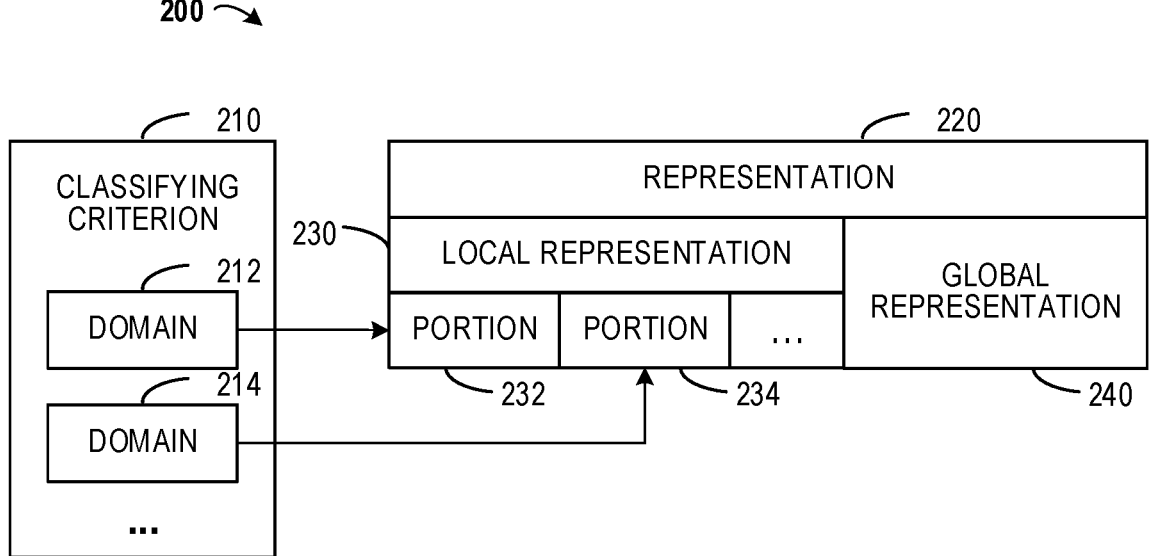
FIG. 2 illustrates an example diagram for feature space management according to implementations of the present disclosure.

Referring to FIG. 2 for a brief of the present disclosure, here FIG. 2 illustrates an example diagram 200 for feature space management according to implementations of the present disclosure. As illustrated in the left side of FIG. 2, the classifying criterion 210 may be defined in advance for classifying data samples into a plurality of predefined domains. For example, the classifying criterion 210 may relates to a domain 212, a domain 214, and the like. For example, the classifying criterion 210 may relate to a device type of the user, at this point, the predefined domains may include: a personal computer (PC) domain and a mobile domain. Alternative and/or in addition, the classifying criterion 210 may relate to an OS type of the user device, at this point, the predefined domains may include: an IOS domain and an Android domain. Alternative and/or in addition, the classifying criterion 210 may relate to the video resolution, at this point, the predefined domains may include: a high-resolution domain, a medium-resolution domain, and a low-resolution domain.

Referring to the right side of FIG. 2, a representation 220 may be split into multiple fields. For example, the representation 220 may include a global representation 240 and a local representation 230. Here, the global representation 240 may be determined based on existing solutions. Here, the local representation 230 may be further split into multiple fields. For example, it may have a plurality of portions corresponding the plurality of domains, respectively. Here, a portion 232 may correspond to the domain 212, and a portion 234 may correspond to the domain 214, and the like. At this point, conventional feature space is extended to further include the local representation 230. With these implementations of the present disclosure, respective features in the data sample 110 may be represented in a new structure as shown in FIG. 2.

In implementations of the present disclosure, with the extended feature space, the global representation 230 may be obtained for a feature in a plurality of features of the data sample, and the local representation 240 may be obtained for the feature based on the classifying criterion 210 for classifying the data sample into one of a plurality of predefined domains 212, 214, and the like. Then, the representation 220 may be generated for the feature of the data sample based on the global representation 230 and the local representation 240. With these implementations, the global representation 240 may work as a feature space that is shared by all domains, which is designed to capture universal patterns and knowledges that are shared across all the domains. Further, the local representation 230 may work as a feature space that is dedicated to its own domain, which is designed to capture specific patterns and knowledges that are specific to a certain domain. By learning from collective knowledges, the machine learning model may gain a broader understanding of general user preferences and video content relevance.

Figure 3:
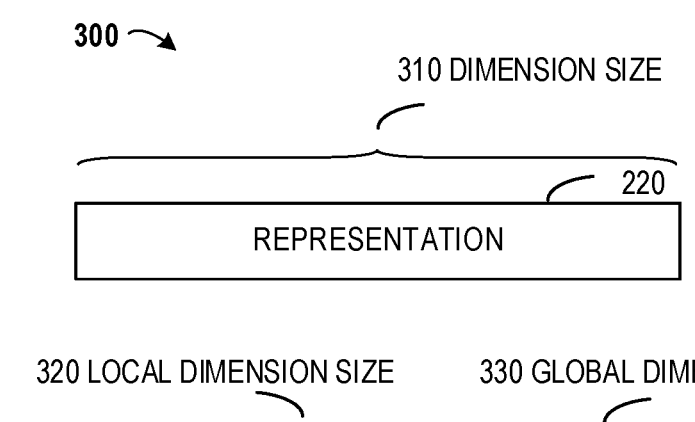
FIG. 3 illustrates an example diagram for an extended feature space according to implementations of the present disclosure.
Figure 3:
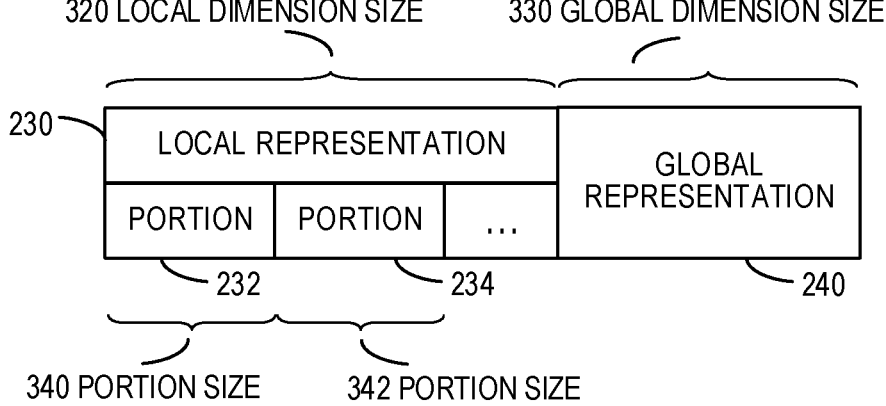

Having provided the general description of the present disclosure, the following paragraphs will provide more details about the feature space management. In implementations of the present disclosure, each field in the representation 220 may have it own size. FIG. 3 illustrates an example diagram 300 for an extended feature space according to implementations of the present disclosure. As illustrated in FIG. 3, the representation 220 may have a dimension size 310. With respect to the two fields in the representation 220, the local representation 230 may have a local dimension size 320, and the global representation 240 may have a global dimension size 330. Further, with respect to the multiple fields in the local representation 230, the portion 232 may have a portion size 340, and the portion 234 may have a portion size 342, and the like.

In implementations of the present disclosure, the local dimension size 320 may indicate impacts of the domain information to the machine learning model. Therefore, the larger the local dimension size 320 is, the more impacts of the domain information are considered in the machine learning model. At this point, the local dimension size 320 may be determined based on an important degree of the domain information. With these implementations of the present disclosure, the local dimension size 320 may be determined in a more effective way for extracting more knowledges within the various domains. As the global representation 240 relates to all the domains and the local representation relates to a specific domain, usually the local dimension size 320 may be smaller than the global dimension size 330. For example, the local dimension size 320 may be set to a half (or another ratio) of the global dimension size 330.

In implementations of the present disclosure, the global dimension size 330 for the global representation 330 may be determined based on a predefined dimension size for the representation 220. In implementations of the present disclosure, the global dimension size 330 may be determined based on the predefined dimension size. Supposing the predefined dimension size is 16 bits, then the global representation 240 may have a length of 16 bits. Further, the local representation 230 may be added and the local dimension size 320 may be decided based on the above procedure. For example, if the domain is important, the local dimension size 320 may be set to 8 bits (or another value determined based on the important degree), and then the dimension size 310 may be set to: 16+8=24 bits. With these implementations of the present disclosure, the representation 220 is extended by the local representation 230 with 8 bits. Accordingly, more bits are used for representing the feature and thus performance of the machine learning model may be increased in capturing specific patterns and knowledges for the specific domain.

In implementations of the present disclosure, the local representation size 320 may be determined based on a difference between the predefined dimension size and the local dimension size 320. For example, if the local dimension size 320 is set to 8 bits and the dimension size 310 is 16 bits, and then the global dimension size 330 may be set to: 16−8=8 bits. With these implementations of the present disclosure, all the 16 bits are split into the local representation 230 (8 bits) and the global representation 240 (8 bits). At this point, more knowledges are obtained for the specific domain without increasing the dimension size 310 of the representation 220.

In implementations of the present disclosure, the local representation may comprise a plurality of portions corresponding to the plurality of predefined domains, respectively, and a sum of a plurality of dimension sizes for the plurality of portions may be equal to the local dimension size 320. In other words, the multiple portions share the local dimension size 320. In implementations of the present disclosure, each portion may have the same size. At this point, a dimension size for a first portion in the plurality of portions may be equal to a dimension size for a second portion in the plurality of portions. In other words, the local dimension size 320 is divided into the multiple portions averagely. Continuing the above example, if there are two domains and the local dimension size 320 is 8 bits, then the portion size 340 for the portion 232 and the portion size 342 for the portion 234 may be set to 8/2=4 bits equally. With these implementations, the dimension sizes for various fields may be determined in an easy and effective way.

Further, the number of data samples belong to a specific domain also affects the knowledge distribution among the data samples, for example, the larger the number of samples involved in a specific domain, the more knowledge may be extracted from the specific domain. At this point, the local dimension size 320 may also be determined based on the number of data samples belonging to the domain. Specifically, if data samples belong to the first domain are more than data samples belong to the second domain, then the portion size 340 may be larger than the portion size. For example, 5 bits from 8 bits may be allocated to the portion 232, and 8−5=3 bits may be allocated to the portion 234.

Figure 4:
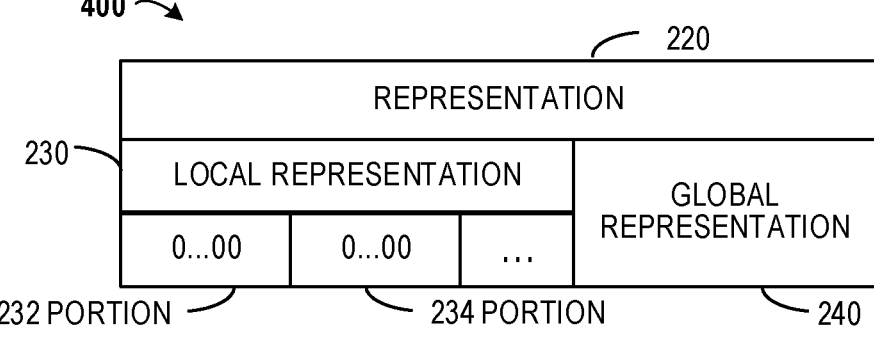
FIG. 4 illustrates an example diagram for initializing a local representation according to implementations of the present disclosure.

In implementations of the present disclosure, once the dimension sizes 340 and 342 are determined, these portions 232, 234 and the like within the local representation 230 may be initialized. Referring to FIG. 4 for more details about the initialization stage, here FIG. 4 illustrates an example diagram 400 for initializing a local representation according to implementations of the present disclosure. As illustrated in FIG. 4, an initialization vector with a length corresponding to the portion size may be loaded into each portion. Continuing the above example where the portions 232 and 234 have the same size of 4 bits, the initialization vector may be represented as (0000) with 4 bits. Alternative and/or in addition, the initialization vector may have another structure if the portion has a different length.

Figure 5:
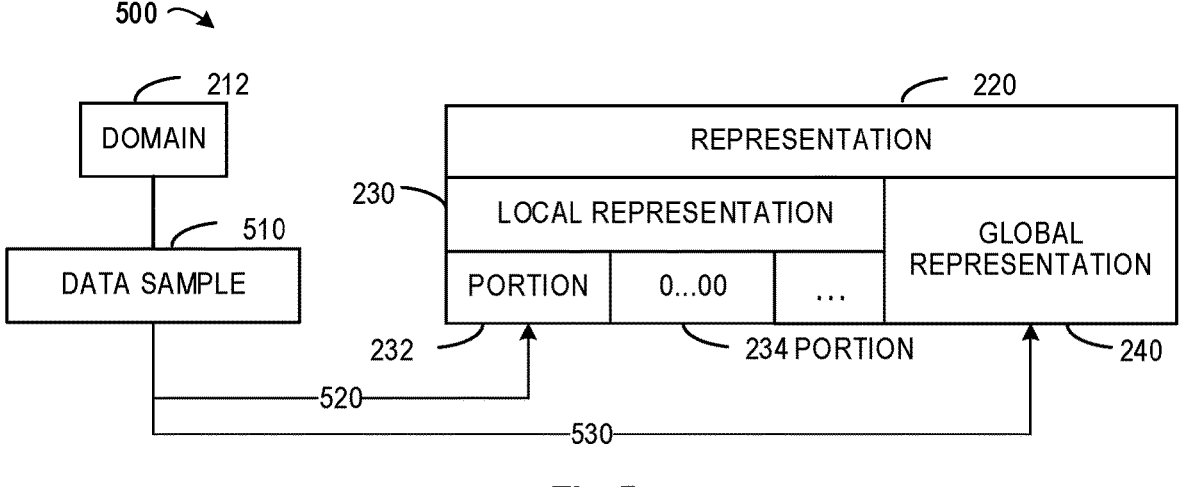
FIG. 5 illustrates an example diagram for updating a local representation according to implementations of the present disclosure.

In implementations of the present disclosure, the local representation may be determined based on the domain of the data sample. Here, a domain of the data sample may be determined based on the classifying criterion, and then the local representation 230 may be obtained based on the domain of the data sample. Specifically, if it is determined that the domain of the data sample belongs to a target domain in the plurality of predefined domains, a target portion in the plurality of portions corresponding to the target domain may be updated. Referring to FIG. 5 for more details about the updating procedure, here FIG. 5 illustrates an example diagram 500 for updating a local representation according to implementations of the present disclosure.

As illustrated in FIG. 5, the domain of the data sample 510 may be determined according to the classifying criterion. Supposing the classifying criterion relates to a device type of the user, and the predefined domains includes: the PC domain and the mobile domain. At this point, the portion 232 may indicate the PC domain, and the portion 234 may indicate the mobile domain. Based on the classifying criterion, if the domain of the data sample 510 belongs to the domain 212 (also referred to as a first domain in the plurality of predefined domains), then portion 232 (i.e., the first portion in the local representation 230) may be updated (as illustrated by an arrow 520) according to the domain; meanwhile the initialization vector in the portion 234 (i.e., the second portion in the local representation 230) remains unchanged. Further, a value in the global representation 240 may be determined (as illustrated by an arrow 530) according to the existing solution.

Figure 6:
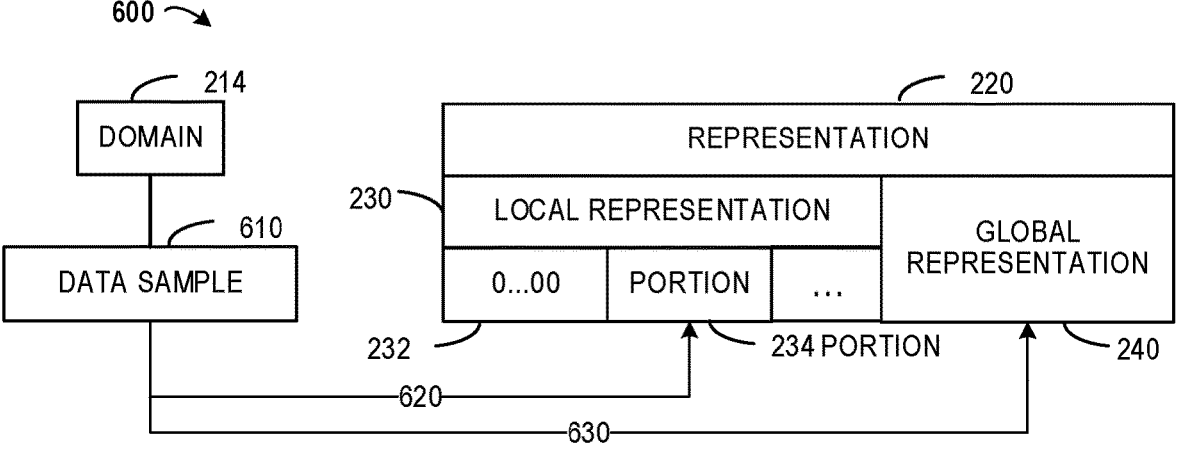
FIG. 6 illustrates an example diagram for updating a local representation according to implementations of the present disclosure.

FIG. 6 illustrates an example diagram 600 for updating a local representation according to implementations of the present disclosure. Based on the classifying criterion, if the domain of the data sample 610 belongs to the domain 214 (also referred to as a second domain in the plurality of predefined domains), then portion 234 (i.e., the second portion in the local representation 230) may be updated (as illustrated by an arrow 620) according to the domain; meanwhile the initialization vector in the portion 232 (i.e., the first portion in the local representation 230) remains unchanged. Further, a value in the global representation 240 may be determined (as illustrated by an arrow 630) according to the existing solution.

Although the above paragraphs have provided details for determining the local representation with an example where the local representation includes two portions respectively corresponding to two domains. Alternatively and/or in addition, the local representation may include more portions for more domains. For example, if the classifying criterion relates to the video resolution, then three domains may include: a high-resolution domain, a medium-resolution domain, and a low-resolution domain. At this point, the local representation may include three portions respectively corresponding to the three domains. Further, the dimension sizes of the three portions may be determined according to the proportion of the numbers of data samples respectively related to the three domains.

Specifically, if there are 200 videos with the high-resolution, 100 videos with the medium-resolution, and 100 videos with the low-resolution, then the dimension sizes of the three portions may be set to: 2:1:1. Supposing the total dimension size for the local representation is 12 bits, the three portions may be set to 6 bits, 3 bits, and 3 bits, respectively. Alternatively and/or in addition, the three portions may be set to 4 bits, 4 bits, and 4 bits, equally.

In implementations of the present disclosure, the local representation 230 and the global representation 240 may be concatenated to form the representation 220. With the concatenated structure, the representation 220 may reflect the knowledges related to all the domains as well as the specific domain. Therefore, the machine learning model can tailor its predictions to accommodate the unique knowledges exhibited different domains.

Figure 7:
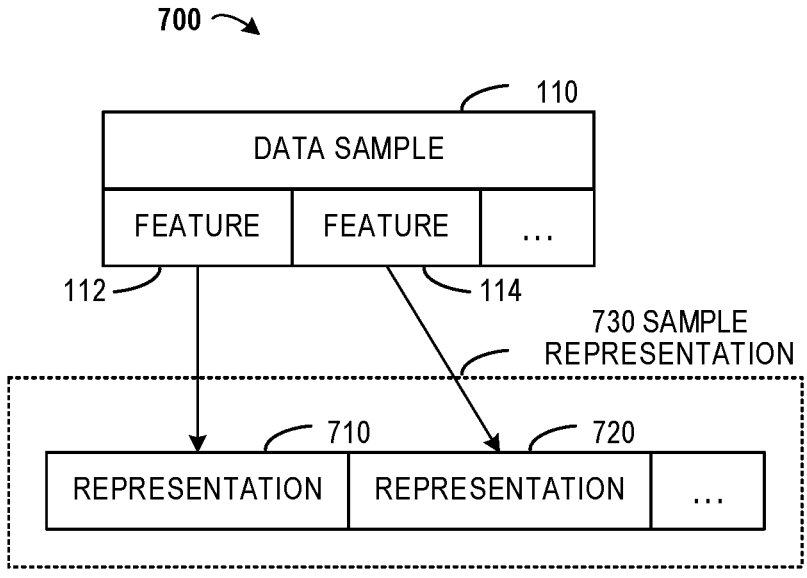
FIG. 7 illustrates an example diagram for determining a sample representation for a data sample according to implementations of the present disclosure.

Although the above paragraphs have provided a determination of the representation for one feature. One or more features of the data sample may be processed according to the above solution. For example, a further representation may be generated for a further feature in the plurality of features of the data sample. Then, a sample representation may be generated for the data sample based on the representation for the feature and the further representation for the further feature. Referring to FIG. 7 for more details, here FIG. 7 illustrates an example diagram 700 for determining a sample representation for a data sample according to implementations of the present disclosure.

As illustrated in FIG. 7, the data sample 110 includes features 112, 114, and the like. A representation 710 may be generated for the feature 112 according to the above procedure, where the representation 710 may include a local representation and a global representation. Similarly, a representation 720 may be generated for the feature 114 according to the above procedure. Next, the representations 710 and 720 may be concatenated to form a sample representation 730. With these implementations, the sample representation 730 may reflect more domain information related to the data sample, and thus may help to increase the performance of the machine learning model.

In implementations of the present disclosure, the sample representation 730 may be inputted into a machine learning model for further processing. For example, a task model may represent an association relationship between a first and a second feature of a reference sample representation of a reference data sample. At this point, the sample representation 730 may be inputted into the task model for obtaining an association relationship between the feature and the further feature.

Figure 8:
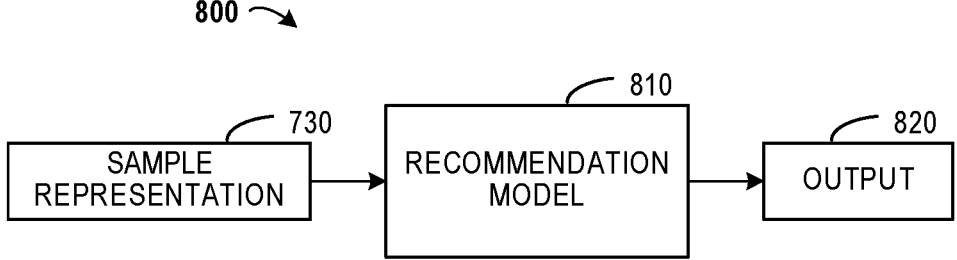
FIG. 8 illustrates an example diagram for obtaining an output from a machine learning model based on the sample representation according to implementations of the present disclosure.

FIG. 8 illustrates an example diagram 800 for obtaining an output from a machine learning model based on the sample representation according to implementations of the present disclosure. Continuing the above example of the recommendation model 810, the recommendation model 810 may be trained and describe an association relationship between the user features and the video features, for example, the association relationship may indicate a probability level whether the user is interested in the video. At this point, the sample representation 730 may be inputted into the recommendation model 810 and an output 820 may be received.

With these implementations of the present disclosure, the sample representation 730 includes exclusive feature spaces may be created for each domain identified by the classifying criterion, which is dedicated to capturing domain-specific knowledge and characteristics. At this point, the recommendation model 810 may learn more knowledges about the domain information and thus performance of the recommendation model 810 may be increased.

The above paragraphs have described details for the feature space management. According to implementations of the present disclosure, a method is provided for extending a feature space of a data sample. Reference will be made to FIG. 9 for more details about the method, where FIG. 9 illustrates an example flowchart of a method 900 for extending a feature space according to implementations of the present disclosure. At a block 910, a global representation is obtained for a feature in a plurality of features of the data sample. At a block 920, a local representation is obtained for the feature based on a classifying criterion for classifying the data sample into one of a plurality of predefined domains. At a block 930, a representation is generated for the feature of the data sample based on the global representation and the local representation.

In implementations of the present disclosure, obtaining the local representation for the feature comprises: determining a domain of the data sample based on the classifying criterion; and obtaining the local representation based on the domain of the data sample.

In implementations of the present disclosure, a global dimension size for the global representation for the feature is determined based on a predefined dimension size for the representation for the feature.

In implementations of the present disclosure, the global dimension size is determined based on any of: a difference between the predefined dimension size and a local dimension size for the local representation for the feature; or the predefined dimension size.

In implementations of the present disclosure, the local representation comprises a plurality of portions corresponding to the plurality of predefined domains, respectively, a sum of a plurality of dimension sizes for the plurality of portions is equal to the local dimension size.

In implementations of the present disclosure, a dimension size for a portion in the plurality of portions is determined based on any of: an important degree of a domain corresponding to the portion, or a number of data samples belonging to a domain corresponding to the portion.

In implementations of the present disclosure, a dimension size for a first portion in the plurality of portions is equal to a dimension size for a second portion in the plurality of portions.

In implementations of the present disclosure, obtaining the local representation comprises: initializing the plurality of portions in the local representation, respectively; and in response to a determination that the domain of the data sample belongs to a target domain in the plurality of predefined domains, updating a target portion in the plurality of portions corresponding to the target domain.

In implementations of the present disclosure, the method further comprises: generating a further representation for a further feature in the plurality of features of the data sample; and generating a sample representation for the data sample based on the representation for the feature and the further representation for the further feature.

In implementations of the present disclosure, the method further comprises: obtaining an association relationship between the feature and the further feature according to a task model and the sample representation, the task model representing an association relationship between a first and a second feature of a reference sample representation of a reference data sample.

According to implementations of the present disclosure, an apparatus is provided for extending a feature space of a data sample. The apparatus comprises: a global obtaining unit, being configured for obtaining a global representation for a feature in a plurality of features of the data sample; a local unit, being configured for obtaining a local representation for the feature based on a classifying criterion for classifying the data sample into one of a plurality of predefined domains; and a generating unit, being configured for generating a representation for the feature of the data sample based on the global representation and the local representation. Further, the apparatus may comprise other units for implementing other steps in the method 800.

According to implementations of the present disclosure, an electronic device is provided for implementing the method 800. The electronic device comprises: a computer processor coupled to a computer-readable memory unit, the memory unit comprising instructions that when executed by the computer processor implements a method for extending a feature space of a data sample. The method comprises: obtaining a global representation for a feature in a plurality of features of the data sample; obtaining a local representation for the feature based on a classifying criterion for classifying the data sample into one of a plurality of predefined domains; and generating a representation for the feature of the data sample based on the global representation and the local representation.

In implementations of the present disclosure, obtaining the local representation for the feature comprises: determining a domain of the data sample based on the classifying criterion; and obtaining the local representation based on the domain of the data sample.

In implementations of the present disclosure, a global dimension size for the global representation for the feature is determined based on a predefined dimension size for the representation for the feature.

In implementations of the present disclosure, the global dimension size is determined based on any of: a difference between the predefined dimension size and a local dimension size for the local representation for the feature; or the predefined dimension size.

In implementations of the present disclosure, the local representation comprises a plurality of portions corresponding to the plurality of predefined domains, respectively, a sum of a plurality of dimension sizes for the plurality of portions is equal to the local dimension size.

In implementations of the present disclosure, a dimension size for a portion in the plurality of portions is determined based on any of: an important degree of a domain corresponding to the portion, or a number of data samples belonging to a domain corresponding to the portion.

In implementations of the present disclosure, a dimension size for a first portion in the plurality of portions is equal to a dimension size for a second portion in the plurality of portions.

In implementations of the present disclosure, obtaining the local representation comprises: initializing the plurality of portions in the local representation, respectively; and in response to a determination that the domain of the data sample belongs to a target domain in the plurality of predefined domains, updating a target portion in the plurality of portions corresponding to the target domain.

In implementations of the present disclosure, the method further comprises: generating a further representation for a further feature in the plurality of features of the data sample; and generating a sample representation for the data sample based on the representation for the feature and the further representation for the further feature.

In implementations of the present disclosure, the method further comprises: obtaining an association relationship between the feature and the further feature according to a task model and the sample representation, the task model representing an association relationship between a first and a second feature of a reference sample representation of a reference data sample.

According to implementations of the present disclosure, a computer program product, the computer program product comprising a computer readable storage medium having program instructions embodied therewith, the program instructions executable by an electronic device to cause the electronic device to perform the method 900.

FIG. 9 illustrates a block diagram of a computing device 900 in which various implementations of the present disclosure can be implemented. It would be appreciated that the computing device 900 shown in FIG. 9 is merely for purpose of illustration, without suggesting any limitation to the functions and scopes of the present disclosure in any manner. The computing device 1000 may be used to implement the above method 1000 in implementations of the present disclosure. As shown in FIG. 10, the computing device 1000 may be a general-purpose computing device. The computing device 1000 may at least comprise one or more processors or processing units 1010, a memory 1020, a storage unit 1030, one or more communication units 1040, one or more input devices 1050, and one or more output devices 1060.

The processing unit 1010 may be a physical or virtual processor and can implement various processes based on programs stored in the memory 1020. In a multi-processor system, multiple processing units execute computer executable instructions in parallel so as to improve the parallel processing capability of the computing device 1000. The processing unit 1010 may also be referred to as a central processing unit (CPU), a microprocessor, a controller, or a microcontroller.

The computing device 1000 typically includes various computer storage medium. Such medium can be any medium accessible by the computing device 1000, including, but not limited to, volatile and non-volatile medium, or detachable and non-detachable medium. The memory 1020 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1030 may be any detachable or non-detachable medium and may include a machine-readable medium such as a memory, flash memory drive, magnetic disk, or another other media, which can be used for storing information and/or data and can be accessed in the computing device 1000.

The computing device 1000 may further include additional detachable/non-detachable, volatile/non-volatile memory medium. Although not shown in FIG. 10, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1040 communicates with a further computing device via the communication medium. In addition, the functions of the components in the computing device 1000 can be implemented by a single computing cluster or multiple computing machines that can communicate via communication connections. Therefore, the computing device 1000 can operate in a networked environment using a logical connection with one or more other servers, networked personal computers (PCs) or further general network nodes.

The input device 1050 may be one or more of a variety of input devices, such as a mouse, keyboard, tracking ball, voice-input device, and the like. The output device 1060 may be one or more of a variety of output devices, such as a display, loudspeaker, printer, and the like. By means of the communication unit 1040, the computing device 1000 can further communicate with one or more external devices (not shown) such as the storage devices and display device, with one or more devices enabling the user to interact with the computing device 1000, or any devices (such as a network card, a modem, and the like) enabling the computing device 1000 to communicate with one or more other computing devices, if required. Such communication can be performed via input/output (I/O) interfaces (not shown).

In some implementations, instead of being integrated in a single device, some, or all components of the computing device 1000 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations be performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described and other implementations, enhancements and variations can be made based on what is described and illustrated in the present disclosure.

What is claimed is:

1. A computer-implemented method for video recommendation based on an extended feature space of a data sample of a machine learning model, the data sample comprising any of user data of a user or video data of a video in a recommendation system for recommending videos to users, the method comprising:

obtaining, by a computing device, a global representation for a feature in a plurality of features of the data sample, wherein a global dimension size for the global representation for the feature is determined based on a predefined dimension size for the representation for the feature;

obtaining, by the computing device, a local representation for the feature based on a classifying criterion for classifying the data sample into one of a plurality of predefined domains;

generating, by the computing device, a representation for the feature of the data sample based on the global representation and the local representation; and recommending, by the computing device and the machine learning model, the video to the user based on the generated representation for the feature of the data sample.

2. The method of claim 1, wherein obtaining the local representation for the feature comprises:

determining a domain of the data sample based on the classifying criterion; and obtaining the local representation based on the domain of the data sample.

3. The method of claim 1, wherein the global dimension size is determined based on any of:

a difference between the predefined dimension size and a local dimension size for the local representation for the feature; or the predefined dimension size.

4. The method of claim 1, wherein the local representation comprises a plurality of portions corresponding to the plurality of predefined domains, respectively, a sum of a plurality of dimension sizes for the plurality of portions is equal to the local dimension size.

5. The method of claim 4, wherein a dimension size for a portion in the plurality of portions is determined based on any of:

an important degree of a domain corresponding to the portion, or a number of data samples belonging to a domain corresponding to the portion.

6. The method of claim 5, wherein a dimension size for a first portion in the plurality of portions is equal to a dimension size for a second portion in the plurality of portions.

7. The method of claim 4, wherein obtaining the local representation comprises:

initializing the plurality of portions in the local representation, respectively; and in response to a determination that the domain of the data sample belongs to a target domain in the plurality of predefined domains, updating a target portion in the plurality of portions corresponding to the target domain.

8. The method of claim 1, further comprising:

generating a further representation for a further feature in the plurality of features of the data sample; and generating a sample representation for the data sample based on the representation for the feature and the further representation for the further feature.

9. The method of claim 8, further comprising: obtaining an association relationship between the feature and the further feature according to a task model and the sample representation, the task model representing an association relationship between a first and a second feature of a reference sample representation of a reference data sample.

10. An electronic device, comprising a computer processor coupled to a computer-readable memory unit, the memory unit comprising instructions that when executed by the computer processor implements a method for video recommendation based on an extended feature space of a data sample of a machine learning model, the data sample comprising any of user data of a user or video data of a video in a recommendation system for recommending videos to users, the method comprising:

obtaining a global representation for a feature in a plurality of features of the data sample, wherein a global dimension size for the global representation for the feature is determined based on a predefined dimension size for the representation for the feature;

obtaining a local representation for the feature based on a classifying criterion for classifying the data sample into one of a plurality of predefined domains;

generating a representation for the feature of the data sample based on the global representation and the local representation; and recommending, by the computing device and the machine learning model, the video to the user based on the generated representation for the feature of the data sample.

11. The device of claim 10, wherein obtaining the local representation for the feature comprises:

determining a domain of the data sample based on the classifying criterion; and obtaining the local representation based on the domain of the data sample.

12. The device of claim 10, wherein the global dimension size is determined based on any of:

a difference between the predefined dimension size and a local dimension size for the local representation for the feature; or the predefined dimension size.

13. The device of claim 10, wherein the local representation comprises a plurality of portions corresponding to the plurality of predefined domains, respectively, a sum of a plurality of dimension sizes for the plurality of portions is equal to the local dimension size.

14. The device of claim 13, wherein a dimension size for a portion in the plurality of portions is determined based on any of:

an important degree of a domain corresponding to the portion, or a number of data samples belonging to a domain corresponding to the portion.

15. The device of claim 13, wherein obtaining the local representation comprises:

initializing the plurality of portions in the local representation, respectively; and in response to a determination that the domain of the data sample belongs to a target domain in the plurality of predefined domains, updating a target portion in the plurality of portions corresponding to the target domain.

16. The device of claim 10, wherein the method further comprises:

generating a further representation for a further feature in the plurality of features of the data sample; and generating a sample representation for the data sample based on the representation for the feature and the further representation for the further feature.

17. The device of claim 16, wherein the method further comprises:

obtaining an association relationship between the feature and the further feature according to a task model and the sample representation, the task model representing an association relationship between a first and a second feature of a reference sample representation of a reference data sample.

18. A non-transitory computer program product, the non-transitory computer program product comprising a computer readable storage medium having program instructions embodied therewith, the program instructions executable by an electronic device to cause the electronic device to perform a method for video recommendation based on an extended feature space of a data sample of a machine learning model, the data sample comprising any of user data of a user or video data of a video in a recommendation system for recommending videos to users, the method comprising:

obtaining a global representation for a feature in a plurality of features of the data sample, wherein a global dimension size for the global representation for the feature is determined based on a predefined dimension size for the representation for the feature;

obtaining a local representation for the feature based on a classifying criterion for classifying the data sample into one of a plurality of predefined domains;

generating a representation for the feature of the data sample based on the global representation and the local representation; and recommending, by the computing device and the machine learning model, the video to the user based on the generated representation for the feature of the data sample.

* * * * *